United States Patent
McCarthy, III

(10) Patent No.: US 9,368,157 B2
(45) Date of Patent: Jun. 14, 2016

(54) RECORDED CONTENT REPAIR

(71) Applicant: EchoStar Technologies L.L.C., Englewood, CO (US)

(72) Inventor: Bernard A. McCarthy, III, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 239 days.

(21) Appl. No.: 14/137,408

(22) Filed: Dec. 20, 2013

(65) Prior Publication Data

US 2015/0179221 A1 Jun. 25, 2015

(51) Int. Cl.
*H04N 5/775* (2006.01)
*G11B 27/034* (2006.01)
*H04N 5/85* (2006.01)

(52) U.S. Cl.
CPC .............. *G11B 27/034* (2013.01); *H04N 5/775* (2013.01); *H04N 5/85* (2013.01)

(58) Field of Classification Search
None
See application file for complete search history.

(56) References Cited

U.S. PATENT DOCUMENTS

| | | | |
|---|---|---|---|
| 2004/0078624 A1 | 4/2004 | Maxemchuk | |
| 2006/0165374 A1 | 7/2006 | Newton | |
| 2011/0019978 A1* | 1/2011 | Jagmag | H04N 7/17318 386/351 |
| 2011/0026902 A1 | 2/2011 | Nguyen | |
| 2015/0071620 A1* | 3/2015 | Keohane | G11B 27/029 386/287 |
| 2015/0179222 A1 | 6/2015 | Kapa, Jr. et al. | |

OTHER PUBLICATIONS

U.S. Appl. No. 14/137,471, filed Dec. 20, 2013, Non Final Rejection mailed Oct. 7, 2015, 18 pages.
U.S. Appl. No. 14/137,471, filed Dec. 20, 2013, Final Rejection mailed Mar. 29, 2016, all pages.

* cited by examiner

*Primary Examiner* — Eileen Adams

(74) *Attorney, Agent, or Firm* — Kilpatrick Townsend & Stockton LLP

(57) ABSTRACT

A television receiver may detect during a primary recording of particular programming degradation of a received signal quality associated with the particular programming to at or below a predetermined threshold value. The television receiver may instantiate a secondary recording of the particular programming during the primary recording when the particular programming is accessible over at least one terrestrial network. The television receiver may query a computing system to acquire content associated with at least one gap in content within the primary recording present due to received signal quality. The television receiver may output during playback of the primary recording a notification to enable access to the secondary recording when content associated with the at least one gap in content within the primary recording is unavailable over the at least one terrestrial network.

20 Claims, 7 Drawing Sheets

RECORDED CONTENT REPAIR

CROSS-REFERENCE TO RELATED APPLICATION

This application is related to U.S. Nonprovisional patent application Ser. No. 14/137,471, filed on even date herewith, entitled "RECORDED CONTENT REPAIR," the entirety of which is hereby incorporated by reference for all intents and purposes.

BACKGROUND

The advent of the digital video recorder and the availability of high-capacity and affordable computer-readable storage devices have made available many possibilities to television programming service providers and viewers alike. In addition, television viewers have come to expect flexibility and reliability with respect to the recording and accessing of recorded content via their television receivers.

SUMMARY

This Summary does not in any way limit the scope of the claimed subject matter.

In an aspect, a method may include or comprise detecting, by a television receiver during a primary recording of particular programming, degradation of a received signal quality associated with the particular programming to at or below a predetermined threshold value. The method may include or comprise instantiating, by a television receiver in response to the detecting, a secondary recording of the particular programming during the primary recording when the particular programming is accessible over at least one terrestrial network. The method may include or comprise querying, by the television receiver over the at least one terrestrial network, a computing system to acquire content associated with at least one gap in content within the primary recording present due to received signal quality. The method may include or comprise outputting, by the television receiver for display by a presentation device during playback of the primary recording, a notification to enable access to the secondary recording when content associated with the at least one gap in content within the primary recording is unavailable over the at least one terrestrial network.

In an aspect, a television receiver may include or comprise one or more processors; and a memory communicatively coupled with and readable by the one or more processors and having stored therein processor-readable instructions. The processor-readable instructions when executed by the one or more processors may cause the one or more processors to instantiate a secondary recording of particular programming during a primary recording of the particular programming when the particular programming is accessible over at least one terrestrial network during the primary recording and a received signal quality associated with the primary recording is at or below a predetermined threshold value. The processor-readable instructions when executed by the one or more processors may cause the one or more processors to query over the at least one terrestrial network a computing system to acquire content associated with at least one gap in content within the primary recording present due to received signal quality. The processor-readable instructions when executed by the one or more processors may cause the one or more processors to output for display by a presentation device during playback of the primary recording a notification to enable access to the secondary recording when content associated with the at least one gap in content within the primary recording is unavailable over the at least one terrestrial network.

In an aspect, a method may include or comprise detecting, by a television receiver during a primary recording of particular programming, degradation of a received signal quality associated with the particular programming to at or below a predetermined threshold value. The method may include or comprise instantiating, by a television receiver in response to the detecting, a secondary recording of the particular programming during the primary recording when the particular programming is accessible over at a terrestrial network selected from an over-the-air network and a packet-based network. The method may include or comprise querying, by the television receiver over the at least one terrestrial network, a computing system to acquire content associated with at least one gap in content within the primary recording present due to received signal quality. The method may include or comprise receiving content associated with the secondary recording from one of the computing system and a system other than the computing system over the at least one terrestrial network. The method may include or comprise outputting, by the television receiver for display by a presentation device during playback of the primary recording, a notification to enable access to the secondary recording during playback of the primary recording. The method may include or comprise outputting for display by the presentation device the secondary recording in response to selection of the notification.

DETAILED DESCRIPTION

Figure 1:
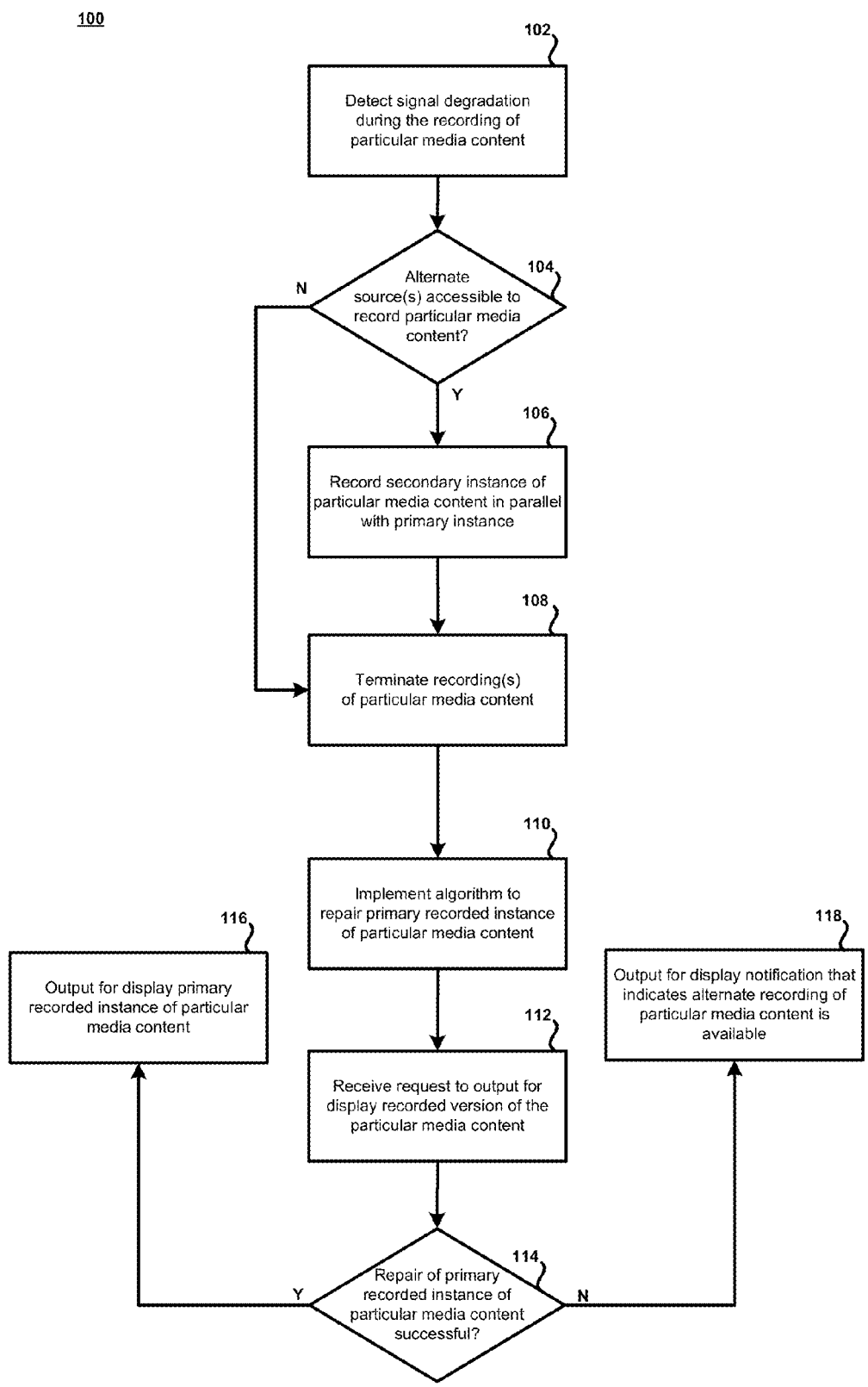
FIG. 1 shows a first example method in accordance with the disclosure.

The present disclosure is directed to or towards systems and methods for repairing recorded media content. In satellite television distribution systems it is not uncommon for received signal degradation to occur due to rain fade, or by some other mechanism. In many instances, the signal may be completely lost for a finite period of time, and thus a gap in the recording would occur if certain programming is being recorded during that time period. This is an undesirable but generally unavoidable consequence of satellite television distribution systems. This and other issues are addressed or resolved by the various features or aspects of the present disclosure. For instance, referring now to FIG. 1, a first example method 100 for repairing recorded media content is shown in accordance with the disclosure.

The example method 100 may include detecting (module 102), by a television receiver, degradation of a received satellite signal during the recording of particular media content that is broadcast on that signal. For example, the television receiver, or a DVR (Digital Video Recorder) coupled to or integrated with the television receiver, may currently be recording a live instance of Monday Night Football that is broadcast by a satellite content provider as part of a dedicated service, such as the "Multi-Sport Pack" offered by DISH® Network. In this example, various mechanisms, such as inclement weather, may affect received signal strength until the signal strength is at or below a threshold value, and once the received satellite signal meets that criterion the television receiver may determine that signal strength has degraded to the point where it may be beneficial to seek an alternate source to record the particular media content.

For example, the method 100 may further include determining (module 104), by the television receiver, whether or not an alternate or alternative source is available or accessible to record the particular media content. It is contemplated that there are many types of such sources. For example, the television receiver may make a determination as to whether or not the Monday Night Football game is currently being broadcast by an OTA (Over-The-Air) service. In this example, it may be assumed that the television receiver is configured to detect and receive OTA service. For example, an antenna may be coupled to the television receiver, and a particular tuner of the television receiver may be dedicated to tune to OTA broadcasts. As another example, the television receiver make a determination as to whether or not the Monday Night Football game is currently being made available over the Internet by an IPTV (Internet Protocol Television) service. In this example, it may be assumed that the television receiver is configured to detect and receive content over an Internet connection. Other examples are possible. Regardless, when an alternate source is accessible it may be beneficial to instantiate another, secondary recording of the particular media.

For example, the method 100 may further include recording (module 106), by the television receiver, in parallel with the recording of the particular media content via satellite connection, the particular media content from an alternate source when it is determined that an alternate source is available. For example, the television receiver may simultaneously or concurrently record the live instance of Monday Night Football that is broadcast by the satellite content provider, even though signal quality at a particular instance in time may be poor or possibly lost, along with a live instance of Monday Night Football that is broadcast, delivered, or otherwise made available by an alternate source, such as via OTA or IPTV. In this example, if or when multiple alternate sources are currently available, a priority scheme may be used by the television receiver to determine or select a preferred content source from among multiple alternate sources. For example, in some embodiments, an OTA source may be preferred over an IPTV source, since OTA service is generally free whereas receiving television programming content via broadband connection may consume limited bandwidth resources. For example, a particular Internet subscription may only allow a customer a finite bandwidth usage or consumption on a monthly basis. Regardless of whether or not the television receiver acquires two separate recordings of the particular media, the television receiver may terminate at least one recording of the particular media when a broadcast of that content has completed.

For example, the method 100 may further include terminating (module 108), by the television receiver, the primary recording of the particular media content, that is, the recording of the particular media content as broadcast by the satellite content provider. In some instances, the television receiver may additionally terminate the secondary recording of the particular media content, that is, the recording of the particular media content as broadcast or provided by a selected alternate source. For example, when the live instance of Monday Night Football has ended the television receiver may stop the recording of that football game made via satellite connection, and possibly also stop the recording of that football game made via OTA or IPTV. Accordingly, the television receiver may have a partially corrupted but full recording of the Monday Night Football game (i.e., primary instance), and possibly a non-corrupted but partial recording of the Monday Night Football game (i.e., secondary instance). In either case, it may be beneficial to at least attempt to repair the primary recorded instance of the particular media content.

For example, the method 100 may further include implementing (module 110), by the television receiver, an algorithm to attempt to repair the primary recorded instance of the particular media content. For example, the television receiver may contact via broadband connection the satellite content provider to determine whether the television receiver can retrieve either the entire version of the Monday Night Football game, or at least any portions or clips of the Monday Night Football game, as originally broadcast by the satellite content provider, and then directly repair those sections of the primary recorded instance of the particular media content. In many instances, it may be preferred to only retrieve those portions or clips of the Monday Night Football game that may have been lost during the signal degradation event. Here, for example, the television receiver may determine from the primary recorded instance of the particular media content that a gap is present from or between arbitrary time T1 to between arbitrary time T2, based on an analysis of the primary recorded instance of the particular media content. Next, the television receiver may contact the satellite content provider to acquire the audio/video of the Monday Night Football game from time T1 to time T2, and then insert that audio/video into the recording when received from the satellite content provider. In either case, when the content is available to the television receiver, the television receiver may repair the primary recorded instance of the particular media content so that a television viewer would not perceive a gap in that recording when played back. As discussed throughout, such a feature may be beneficial and/or advantageous in many respects.

For example, the method 100 may further include receiving (module 112), by the television receiver, a request to output for display the primary recorded instance of the particular media content. For example, the television receiver may be configured to output an EPG (Electronic Programming Guide) to a television that is coupled to the television receiver. In general, the EPG may present various information related to television channels and the timing of programs appearing on such television channels. The EPG may further enable a user to browse and select recorded programming for viewing. For example, a user may browse the EPG and select an icon associated with the primary recorded instance of the Monday Night Football game as discussed above for viewing. In this example, the television receiver may initially determine whether the attempted repair of the primary recorded instance of the Monday Night Football game was successful, and then proceed to output that content for display by the television in accordance with that determination.

For example, the method 100 may further include determining (module 114), by the television receiver, whether the repair of the primary recorded instance of the particular media content was successful. When determined successful, the method 100 may further include outputting (module 116), by the television receiver for display by a presentation device, the primary recorded instance of the particular media content. In this example, a notification may optionally also be output for display by the presentation device indicating that a signal degradation event was detected during the recording of particular media content, and that a repair operation was successfully performed so that that recording is no longer corrupted (i.e., there is no longer a gap in the recording). Among other things, the notification may be used to taut the flexibility of the television receiver or system, and possibly serve to attract new customers and/or increase existing customer satisfaction and loyalty by reinforcing the idea the that the television receiver may automatically detect signal degradation or loss events, and repair or restore corrupted content without requiring action to be taken by a customer. In some instances though, the repair of the primary recorded instance of the particular media content might not have been successful. In this scenario, the television receiver may provide an option whereby the secondary recorded instance of the particular media content may be made available for viewing if and when desired.

For example, the method 100 may further include outputting (module 118), by the television receiver for display by a presentation device, a notification that indicates that an alternate recording of the particular media content is or will be made available if or when desired. For example, a notification may be output to specify that a signal degradation event was detected during the recording of the Monday Night Football game, and that a second recording of the Monday Night Football game was made to ensure that all aspects of the game was recorded or captured. The notification may further specify that an option will be made available to a viewer whereby prior to a detected gap in the primary recorded instance the Monday Night Football game a "pop-up," for example, may be displayed so that the viewer is provided the opportunity to switch from the primary recorded instance to the secondary recorded instance. In this manner, the viewer may at all times when setting a recording timer feel confident that audio/video within any gap is not lost, and may instead be accessed when available by other means if desired. Similar to the above discussion, a "pop-up" may be used to taut the flexibility of the television receiver or system, and possibly serve to attract new customers and/or increase existing customer satisfaction and loyalty by reinforcing the idea the that the television receiver may provide an option whereby missing content may be accessed when available if and when desired. Further scenarios and beneficial aspects associated with repairing recorded media as discussed in the context of the present disclosure are described below.

Figure 2:
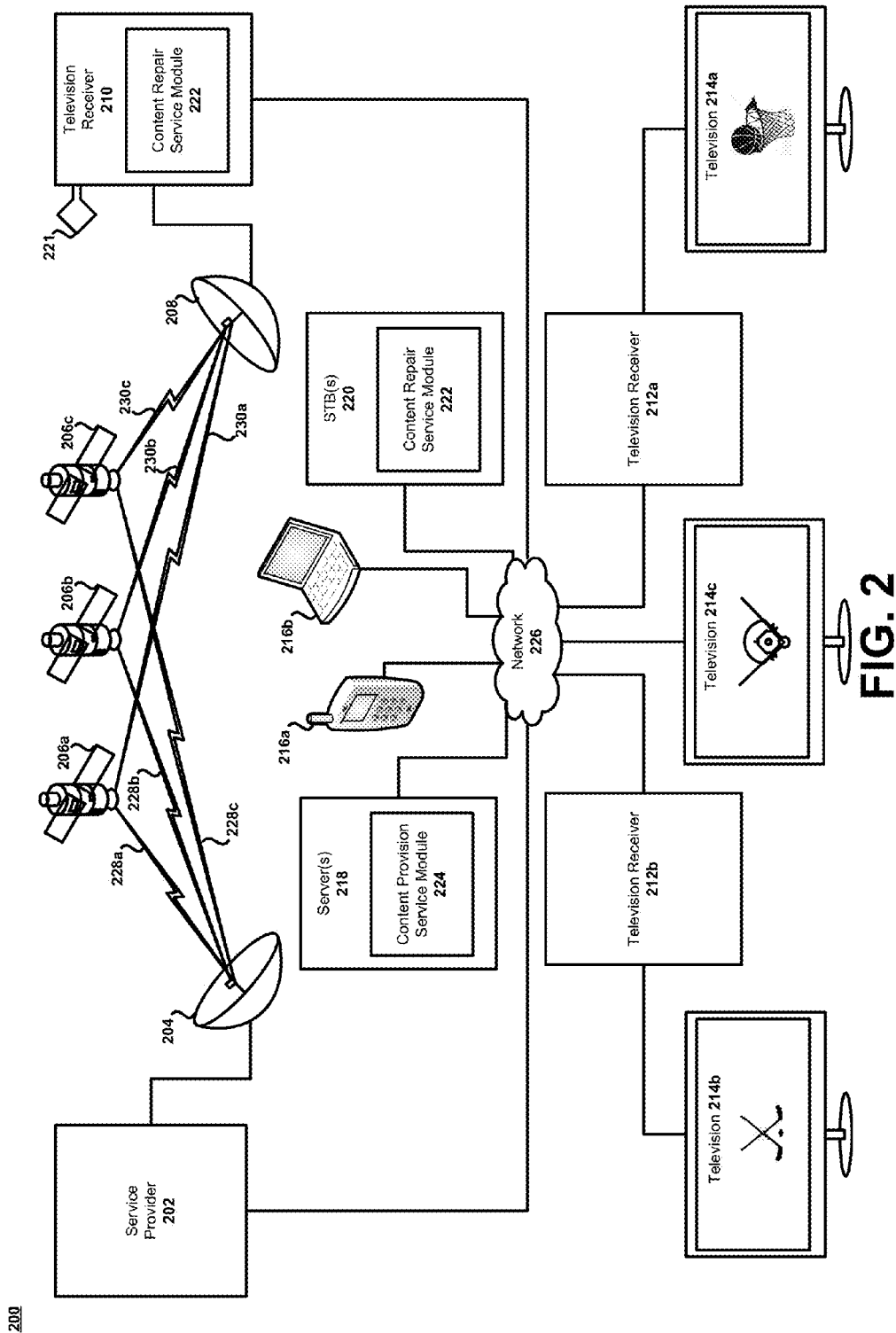
FIG. 2 shows an example satellite system in accordance with the disclosure.

For instance, FIG. 2 illustrates an example satellite television distribution system 200 in accordance with the present disclosure. The system 200 is depicted in a simplified form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system as desired.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, at least one server 218 that may be associated with the service provider 202, and at least one STB (Set-Top-Box) 220. Additionally, an OTA antenna 221 may be coupled to the PTR 210, and the PTR 210 and the STB 220 may include an instance of a content repair service module 222, and the server 218 may include an instance of a content provision service module 224. In general, the content repair service module 222 together or in tandem with the content provision service module 224 may be configured and arranged to implement various features associated recorded media content repair as discussed in the context of the present disclosure. Such a solution may, among other things, attract new customers and increase existing customer satisfaction and loyalty by providing increased flexibility with respect to the accessing and recording of television programming. However, other benefits and/or advantages are possible as well, and an appreciation of such benefits and/or advantages may be understood in light of the present disclosure in its entirety.

For example, and as discussed throughout. repairing a corrupted program from an OTA channel may eliminate the need to download a program over the Internet, thus reducing bandwidth demands and possibly providing a savings opportunity to the customer. Further, in the event content is not available from an OTA broadcast, downloading only a corrupted portion of an event saves time and reduces bandwidth demands, possibly providing a savings opportunity to the customer. Still further, repairing corrupted content as discussed throughout may reduce customer service calls because a customer may not know that signal degradation occurred. Partial recordings can sometimes be interpreted as an issue with recording device.

The system 200 may further include at least one network 226 that establishes a bidirectional communication path for data transfer between and among each respective element of the system 200, outside or separate from the unidirectional satellite signaling path. The network 226 is intended to represent any number of terrestrial and/or non-terrestrial network features or elements. For example, the network 226 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 226, together with the STRs 212a-b and televisions 214a-c, and possibly the computing devices 216a-b, may each be incorporated within or form at least a portion of a particular home computing network. The STB 220 though may be incorporated within or form at least a portion of a different particular home computing network, yet be configured similar to the PTR 210 and/or STRs 212a-b. For example, the PTR 210 may be located within a first household A, whereas the STB 220 may be located within a different second household B. Here, the PTR 210 may be associated with a first customer of the service provider 202, and the STB 220 may be associated with a second different customer of the service provider 202.

Further, the PTR 210 and the STB 220 may each respectively be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still other embodiments are possible.

In practice, the satellites 206a-c may each be configured to receive uplink signals 228a-c from the satellite uplink 204. In this example, each the uplink signals 228a-c may contain one or more transponder streams of particular data or content, such as one or more particular television channels, as supplied by the service provider 202. For example, each of the respective uplink signals 228a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 228a-c to the satellite dish 208 as downlink signals 230a-c. Similar to the uplink signals 228a-c, each of the downlink signals 230a-c may contain one or more transponder streams of particular data or content, such as various encoded and/or at least partially electronically scrambled television channels, on-demand programming, etc., in accordance with an allotted carrier frequency and bandwidth. The downlink signals 230a-c, however, may not necessarily contain the same or similar content as a corresponding one of the uplink signals 228a-c. For example, the uplink signal 228a may include a first transponder stream containing at least a first group or grouping of television channels, and the downlink signal 230a may include a second transponder stream containing at least a second, different group or grouping of television channels. In other examples, the first and second group of television channels may have one or more television channels in common. In sum, there may be varying degrees of correlation between the uplink signals 228a-c and the downlink signals 230a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CSPAN®, ABC®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 230a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other embodiments are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or both of the computing devices 216a-b. Similar to the above-examples, the television channel may generally be presented live, or from a recording as previously stored on the PTR 210, and may be output to one or both of the computing devices 216a-b in accordance with a particular content protection technology and/or networking standard.

Figure 3:
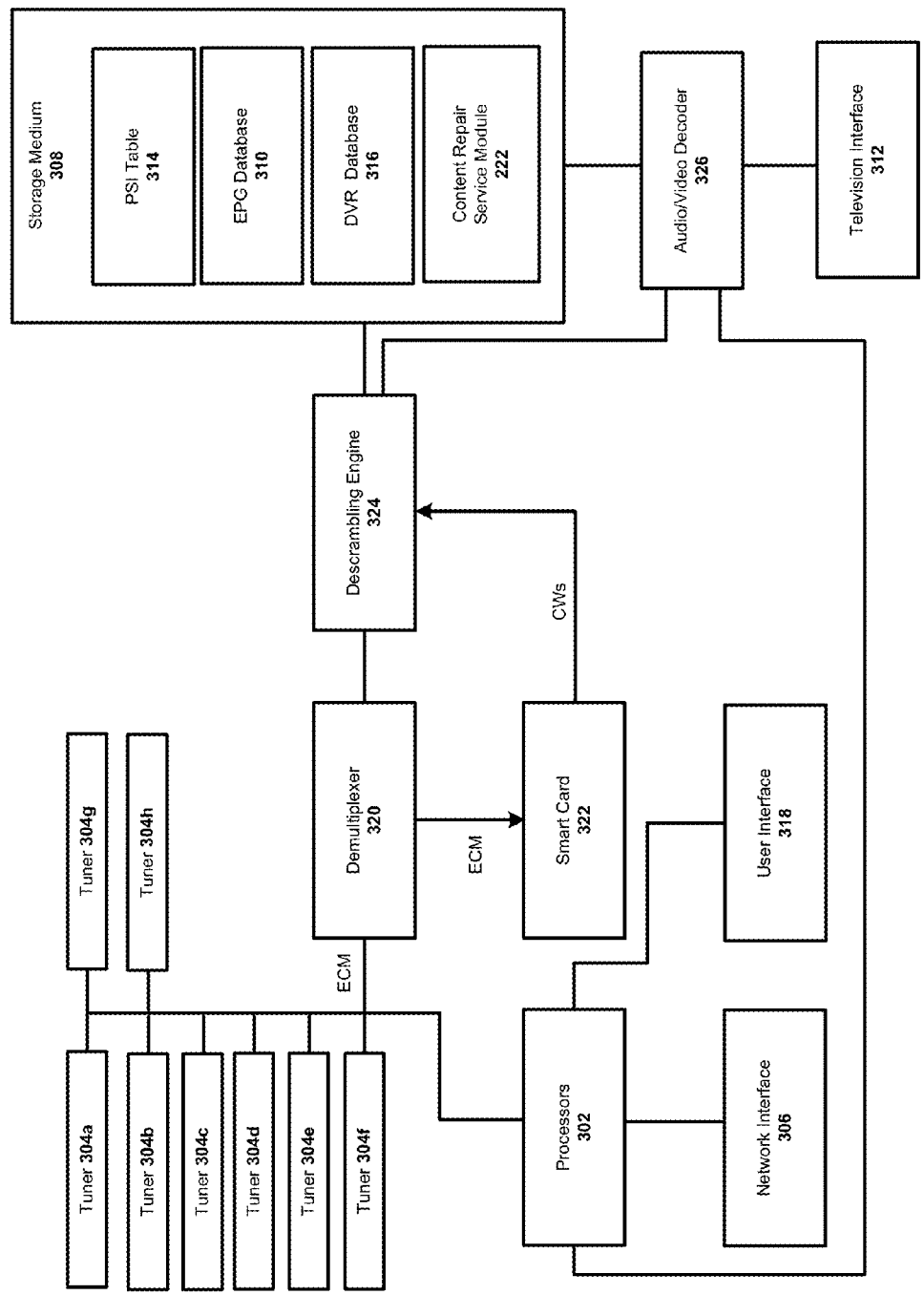
FIG. 3 shows an example block diagram of a television receiver of FIG. 1.

Referring now to FIG. 3, an example block diagram of the PTR 210 of FIG. 2 is shown in accordance with the present disclosure. In some embodiments, the STB 220 and at least one of the STRs 212a-b may be configured in a manner similar to that of the PTR 210. In some embodiment, one or more of the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

For brevity, the PTR 210 is depicted in a simplified form, and may generally include more or fewer elements or components as desired including those configured and/or arranged for repairing recorded media as discussed in the context of the present disclosure. For example, the PTR 210 is shown in FIG. 3 to include the content repair service module 222 as mentioned above in connection with FIG. 2. Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Referring still to FIG. 3, the PTR may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other embodiments, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, OTA broadcast channel, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and another communication channel between the service provider 202 and the PTR 210, which may be bidirectional, may be via the network 226. In general, various types of information may be transmitted and/or received via the network interface 206.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the content repair service module 222 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 226 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other embodiments, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some embodiments, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambles data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 260 may decrypt the ECM to obtain some number of control words. In some embodiments, from each ECM received by the smart card 322, two control words are obtained. In some embodiments, when the smart card 322 receives an ECM, it compares the ECM to the previously received ECM. If the two ECMs match, the second ECM is not decrypted because the same control words would be obtained. In other embodiments, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For simplicity, the PTR 210 of FIG. 3 has been reduced to a block diagram; common parts, such as a power supply for example, have been omitted. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules. Further, the components of the PTR 210 may be part of another device, such as built into a television. Also, while the PTR 210 may be used to receive, store, and present television channels received via a satellite, it should be understood that similar components may be used to receive, store, and present television channels via a cable network.

Figure 4:
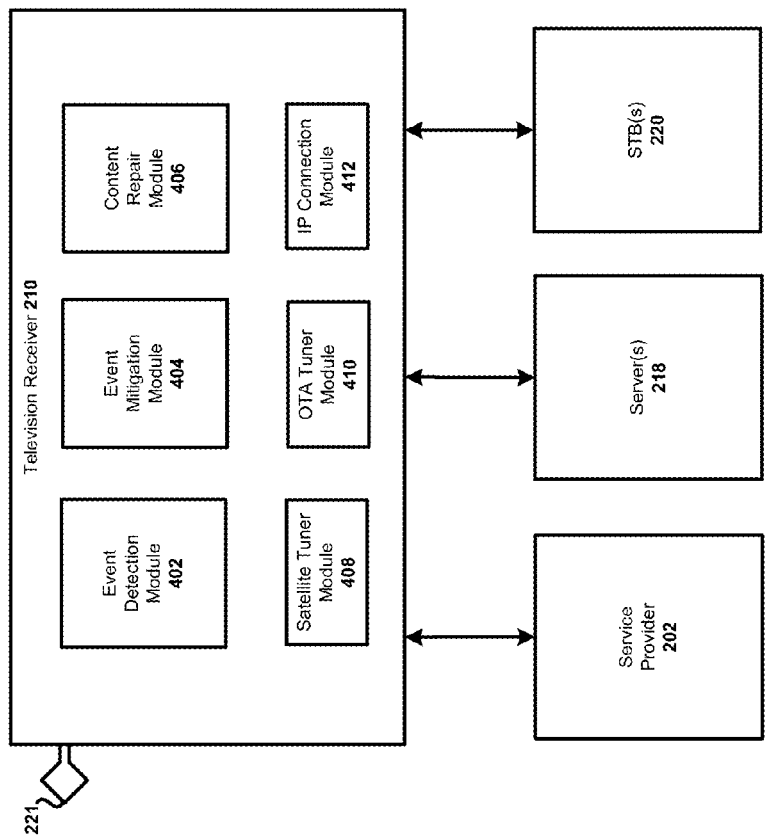
FIG. 4 shows aspects of the example satellite system of FIG. 1 in detail.

Referring now to FIG. 4, a block diagram 400 is shown illustrating particular components of the example system 200 of FIG. 2. More specifically, FIG. 4 shows a number of logical modules of the PTR 210 of FIG. 2, and also shows the service provider 202, the server 218, and the STB 220. In this example, the PTR 210 may at least include an event detection module 402, an event mitigation module 404, a content repair module 406, a satellite tuner module 408, an OTA tuner module 410, and an IP connection module 412. At least the event detection module 402, event mitigation module 404, and content repair module 406 may correspond to or comprise the content repair service module 222 mentioned above. Other embodiments are though possible.

For example, in some embodiments, one or more respective components of the PTR 210 as shown in FIG. 4 may be wholly or at least partially located on one or more other components of the example system 200. For example, one or more respective components of the PTR 210 as shown in FIG. 4 may be wholly or at least partially located on a particular one of the STRs 212a-b. Additionally, any of the logical modules of the PTR 210 as shown in FIG. 4 may be wholly or at least partially implemented in one or more of firmware, software, and hardware.

In practice, the event detection module 402 may monitor strength and/or quality of a signal received by the PTR 210 from one of the satellites 206a-c while the PTR 210 is, for example, recording particular media content. In this example, a particular tuner of the PTR 210 as controlled by the satellite tuner module 408 may be allocated for this primary recording of the particular media content. When the signal strength is determined by the event detection module 402 to be at or below a predetermined threshold value during the recording, the event detection module 402 may activate the event mitigation module 404 so that the event mitigation module 404 may seek an alternate source of or for the particular media content. Here, the particular tuner of the PTR 210 as controlled by the satellite tuner module 408 may still be allocated for the primary recording of the particular media content such that the primary recording is not stopped due decayed signal strength. Rather, the primary recording of the particular media content is continued as in many instances any degradation or loss in satellite signal is only a temporary event, such as when an electrical storm disrupts service for a moment in time, but signal is recovered when the storm passes.

In this example, the event mitigation module 404 may, according to a particular priority scheme is some embodiments, initially make a determination as to whether or not the particular media content is currently available through or by an OTA service. For example, the event mitigation module 404 may query the EPG database 310 of FIG. 3 to determine whether or not the particular media content is currently being broadcast by a terrestrial service provider. If so, a particular tuner of the PTR 210 as controlled by the OTA tuner module 410 may be allocated for a secondary recording of the particular media content. Here, it is assumed that the PTR 210 is arranged and configured to receive and process OTA content. For example, the PTR 210 may be coupled to the antenna 221, and the particular tuner of the PTR 210 as controlled by the OTA tuner module 410 may be configured to pass a desired signal to other respective elements or components of the PTR 210 so that the PTR 210 may process, record, and subsequently output recorded content to a presentation device (e.g., television 214c) for display thereon as desired.

When the event mitigation module 404 makes a determination that particular media is not currently available through or by an OTA service, the event mitigation module 404 may activate the IP connection module 412 and submit a query to one or more remote components so as to make a determination as to whether or not the particular media content is currently available through or by an IPTV service. For example, the event mitigation module 404 may query one or both of the service provider 202 and the server 218 as shown in FIG. 4 to determine whether or not the particular media content is currently being made available by an IPTV service. If so, the event mitigation module 404 may establish a dedicated connection to the IPTV service so that the PTR 210 may implement a secondary recording of the particular media content. In this example, it is assumed that the PTR 210 is arranged and configured to receive and process IPTV content. For example, the PTR 210 may be configured to include hardware and/or software components so that the PTR 210 may receive, process, record, and subsequently output recorded content to a presentation device (e.g., television 214c) for display thereon.

As discussed, the PTR 210 may record a primary instance of the particular media content, and possibly, in parallel, record a secondary instance of the particular media content. Regardless though of whether or not the PTR 210 acquires two separate recordings of the particular media content, the PTR 210 may terminate at least one recording of the particular media content when broadcast of that content has completed. Here, the content repair module 406 may implement an algorithm to attempt to repair the primary recorded instance of the particular media content.

For example, the content repair module 406 may contact via the IP connection module 412 one or both of the service provider 202 and the server 218 to determine whether it is possible for the PTR 210 to retrieve the particular media content in its entirety, or at least any portions or clips of the particular media content that may have been lost due to signal loss or signal degradation as detected by the event detection module 402. Here, it is contemplated that the content repair module 406 may either entirely replace the primary recorded instance of the particular media content, or directly repair those sections of the primary recorded instance of the particular media content that may be absent or corrupt due to signal loss or signal degradation as detected by the event detection module 402. Other embodiments are however possible.

For example, in some embodiments, the content repair module 406 may additionally, or alternatively, contact via the IP connection module 412 the STB 220 to determine whether it is possible for the PTR 210 to retrieve the particular media content in its entirety, or at least any portions or clips of the particular media content that may have been lost due to signal loss or signal degradation as detected by the event detection module 402, directly from the STB 220. It is contemplated that the content repair module 406 may either entirely replace the primary recorded instance of the particular media content, or directly repair those sections of the primary recorded instance of the particular media content that may be absent or corrupt due to signal loss or signal degradation as detected by the event detection module 402. Further, the repair may be performed from content received solely from the STB 220, or from any number of a plurality of similarly configured STBs as desired. An example of such an implementation is discussed within related U.S. Nonprovisional patent application Ser. No. 14/137,471, filed on even date herewith, entitled "RECORDED CONTENT REPAIR," the entirety of which is hereby incorporated by reference for all intents and purposes.

In this example, a particular customer associated with the STB 220 may be required to sign a waiver or disclaimer so that the PTR 210 may access content stored on or by the STB 220 (and possible other STBs) to repair or replace the primary recorded instance of the particular media content as stored on or by the PTR 210. In essence, this may correspond to an agreement between an entity associated with the service provider 202, an entity associated with the PTR 210, and an entity associated with the STB 220 to share programming content or data amongst those parties. The agreement may contain statements associated with privacy and possibly statements associated with bandwidth usage, where one or more parties may be compensated by one or more other parties for the right to use possibly limited broadband connection bandwidth.

Such an implementation as discussed in the context of FIG. 4 with respect to the interactions between one or more respective components of the PTR 210, together with one or more of the service provider 202, the server 218, and the STB 220, is described in further detail below in connection with at least FIG. 5.

Figure 5:
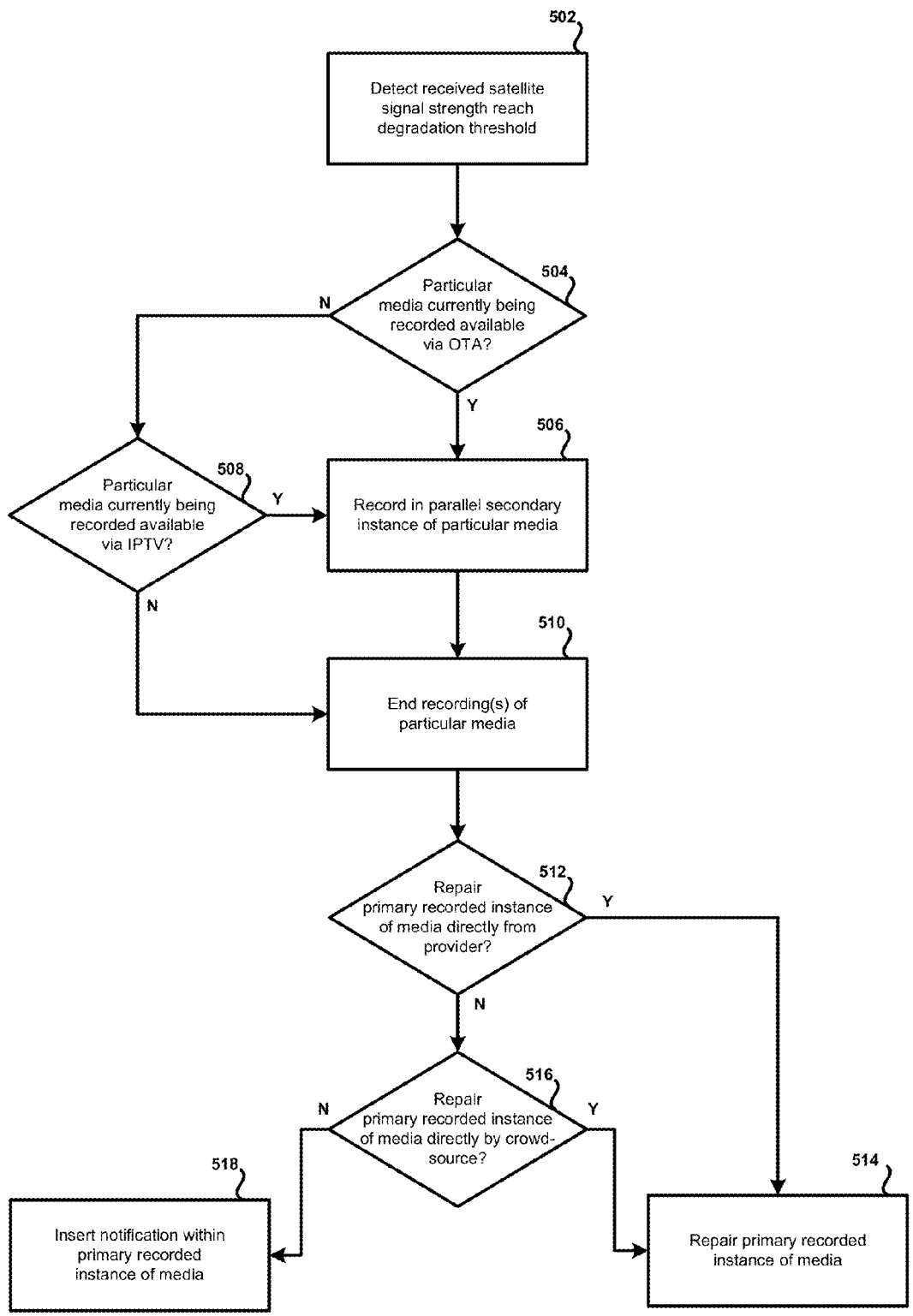
FIG. 5 shows a second example method in accordance with the disclosure.

For example, referring now to FIG. 5, a second example method 500 for repairing recorded media content is shown in accordance with the disclosure. Steps or modules of the method 500 may be performed by the PTR 210 as discussed above. Other embodiments are however possible. For example, one or more steps or modules of the example method 500 may be performed by one or more of the other elements of FIG. 2.

At step 502, the PTR 210 may detect received satellite signal strength reach a predetermined and configurable degradation threshold value during the recording of particular programming that is broadcast on that signal. For example, the PTR 210 may currently be recording a particular movie that is broadcast by the service provider 202 as part of a dedicated content service, such as HBO® for instance. In this example, signal fade may affect received signal strength until the signal strength is at or below the threshold value, and once the received satellite signal meets that criterion the PTR 210 may determine that signal strength has degraded to the point where it may be beneficial to seek an alternate source for the particular media. In some instances, a particular alternate source may be preferred over another different source.

For example, at step 504, the PTR 210 may initially make a determination as to whether or not the particular programming that is currently being recorded is also being currently broadcast by an OTA service. For example, the PTR 210 may query the EPG database 310 as shown in FIG. 3 to determine whether or not the particular movie that is broadcast by the service provider 202 is currently available via OTA. While possible, such an occurrence may be unlikely. Regardless, when the particular programming is determined as currently available via OTA, flow may branch to step 506. At step 506, the PTR 210 may instantiate a secondary recording of the particular programming as received via OTA. When the particular programming is currently unavailable OTA, flow may branch to step 508.

At step 508, the PTR 210 may make a determination as to whether or not the particular programming that is currently being recorded is also currently provided by an IPTV service. For example, the PTR 210 may query one or both of the service provider 202 and the server 218 as shown in FIG. 4 to determine whether or not the particular movie that is broadcast by the service provider 202 is currently available via IPTV. When the particular programming is currently available via IPTV, flow may branch to step 506. At step 506, the PTR 210 may instantiate a secondary recording of the particular programming as received via IPTV. When the particular programming is currently unavailable via IPTV, flow may branch to step 510.

At step 510, the PTR 210 may terminate a primary recording of the particular programming, and possibly a secondary recording of the particular programming. In this example, stopping of the respective recordings may not necessarily occur at the same time. For example, the particular movie that is broadcast by the service provider 202 may not necessarily end at the same time as an instance of the particular movie that is currently broadcast via OTA. However, when the recording of the primary instance and possibly the secondary instance of the particular programming has ceased, flow may branch to step 512. In this example, it may be beneficial to at least attempt to repair the primary recorded instance of the particular programming, and some sources may be preferred over others to repair the same.

For example, at step 512, the PTR 210 may initially make a determination as to whether or not the primary recorded instance of the particular programming may be repaired directly from the source of the same. For example, at step 512, the PTR 210 may contact, via the IP connection module 412 as shown in FIG. 4, the service provider 202 to determine whether the PTR 210 can retrieve either the entire version of the particular movie, or at least any portions or clips of the particular movie, as originally broadcast by the service provider 202, and then directly repair those sections of the primary recorded instance of the particular movie.

When it is determined that the primary recorded instance of the particular programming may be repaired directly from the source of the same, flow may branch to step 514. At step 514, the PTR 210 may acquire either the entire version of the particular programming, or at least any portions or clips of the particular programming, and then insert that audio/video into the primary recorded instance of the particular programming. For example, the PTR 210 may acquire either the entire version of the particular movie, or at least any portions or clips of the particular movie, and then insert that audio/video into the primary recorded instance of the particular movie. Here, the PTR 210 may repair the primary recorded instance of the particular movie so that a viewer would not perceive any gaps in that recording when played-back.

When it is determined that the primary recorded instance of the particular programming may not be repaired directly from the source of the same, flow may branch to step 516. At step 516, the PTR 210 may make a determination as to whether or not the primary recorded instance of the particular programming may be repaired from one or more alternate sources. For example, at step 516, the PTR 210 may contact, via the IP connection module 412 as shown in FIG. 4, the STB 220 to determine whether the PTR 210 can retrieve either the entire version of the particular movie, or at least any portions or clips of the particular movie, as originally broadcast by the service provider 202 but from the STB 220, and then directly repair those sections of the primary recorded instance of the particular movie.

When it is determined that the primary recorded instance of the particular programming may be repaired from one or more alternate sources, flow within the method 500 may branch to step 514. At step 514, the PTR 210 may acquire either the entire version of the particular programming, or at least any portions or clips of the particular programming, from the one or more alternate sources, and then insert that audio/video into the primary recorded instance of the particular programming. For example, the PTR 210 may acquire either the entire version of the particular movie, or at least any portions or clips of the particular movie, from the STB 220, and then insert that audio/video into the primary recorded instance of the particular movie. Here, the PTR 210 may repair the primary recorded instance of the particular movie so that a viewer would not perceive any gaps in that recording when played-back. In some instances though, repair of the primary recorded instance of the particular programming might not be achievable. In this scenario, the PTR 210 may provide an option whereby a secondary recorded instance of the particular programming may be made available for viewing if and when desired.

For example, when the primary recorded instance of the particular programming may not be repaired from one or more alternate sources, flow within the method 500 may branch to step 518. At step 518, the PTR 210 may insert a notification into or within the primary recorded instance of the particular programming that may specify when viewed that an alternate recording of the particular programming will be made available if or when desired. Here, the notification may be output for viewing during playback of the primary recorded instance of the particular programming to specify that a signal degradation event was detected during the recording of the particular programming, and that a second recording of the particular programming was made to ensure that all aspects of the movie was recorded or captured.

For example, the notification may be output for viewing during playback of the primary recorded instance of the particular movie by the PTR 210 to specify that a signal degradation event was detected during the recording of the particular movie, and that a second recording of the particular movie was made to ensure that all aspects of the movie was recorded or captured. The notification may further specify that an option will be made available to a viewer whereby prior to a detected gap in the primary recorded instance of the particular a pop-up, for example, may be displayed so that the viewer is provided the opportunity to switch from the primary recorded instance to the secondary recorded instance. In this manner, the viewer may at all times when setting a recording timer feel confident that audio/video within any gap is not lost, and may instead be accessed when available by other means if desired. Similar to the above discussion, the "pop-up" may be used to taut the flexibility of the television receiver or system, and possibly serve to attract new customers and/or increase existing customer satisfaction and loyalty by reinforcing the idea the that the television receiver may provide an option whereby missing content may be accessed when available if and when desired. Other benefits and/or advantages are possible as well.

Figure 6:
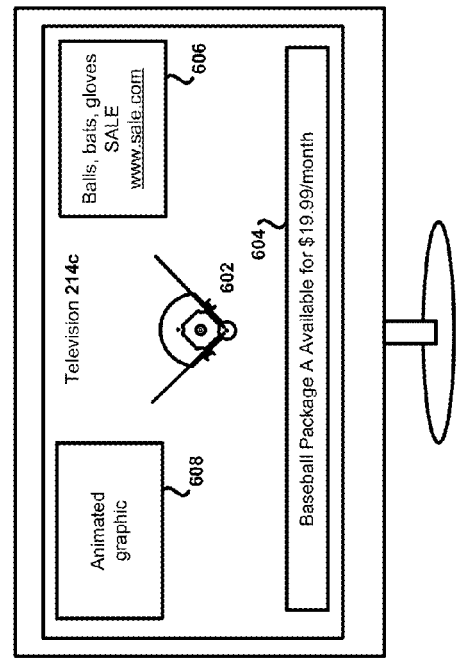
FIG. 6 shows an example monetization scheme in accordance with the disclosure.

Referring now to FIG. 6, an example monetization scheme 600 is shown in accordance with the disclosure. In some embodiments, advertising or advertisements may be inserted into repaired content such that a content provider, such as the service provider 202 of FIG. 1, may derive or develop a revenue stream. Such an implementation may be beneficial and/or advantageous in many respects. For example, in FIG. 6 a baseball game 602 is shown being output by the television 214c of FIG. 2. In this example, it is assumed that the baseball game 602 is currently being output by the PTR 210 to the television 214c from a file that contains a recording of the baseball game 602. It is also assumed that when the baseball game 602 was originally recorded, a gap occurred in that recording due to a rain fade event or by some other mechanism, and that the baseball game 602 was repaired in a manner as discussed above in connection with FIGS. 1-5. Here, it is contemplated that as part of the repair process the PTR 210 may insert into the recording of the baseball game 602 audio, video, or possibly both, associated with one or more advertisements so that as the baseball game 602 is played-back the one or more advertisements are also played-back.

For example, a first advertisement 604 may be displayed at a bottom portion of the screen of the television 214c as the baseball game 602 is played-back. It is contemplated that the first advertisement 604 may be a banner, for example, and may be played-back for a predetermined period of time. The play-back may consist of display of a static image or possibly the display of a scrolling image. Other embodiments are possible. Additionally, or alternatively, a second advertisement 604 may be displayed at a top portion of the screen of the television 214c as the baseball game 602 is played-back. It is contemplated that the second advertisement 606 may be a static graphic such as a still picture, for example, and may be played-back for a predetermined period of time. Other embodiments are possible. Additionally, or alternatively, a third advertisement 608 may be displayed at a top portion of the screen of the television 214c as the baseball game 602 is played-back. It is contemplated that the third advertisement 608 may be an animated graphic such as a video, for example, and may be played-back for a predetermined period of time.

In general, it is contemplated that the service provider 202 may configure and align one or more of the various resources shown in FIG. 2 so that that one or more of the first advertisement 604, second advertisement 606, and third advertisement 608 may be inserted into the recording of the baseball game 602 so that as the baseball game 602 is played-back those advertisements may also be played-back. The service provider 202 may sell that "space" to various advertisers so as to derive profit or revenue. Additionally, or alternatively, the service provider 202 may occupy that space to sell or advertise their own products to increase visibility into those products. Further, those products may be directed to a certain demographic or group as part of a directed advertising campaign. For example, the service provider 202 may insert an advertisement into the recording of the baseball game 602 that indicates or specifies that "Baseball Package A Available for $19.99/month" so that a viewer is made aware that "Baseball Package A" is on-sale for only "$19.99/month." It will be appreciated that many other embodiments are possible as well.

Figure 7:
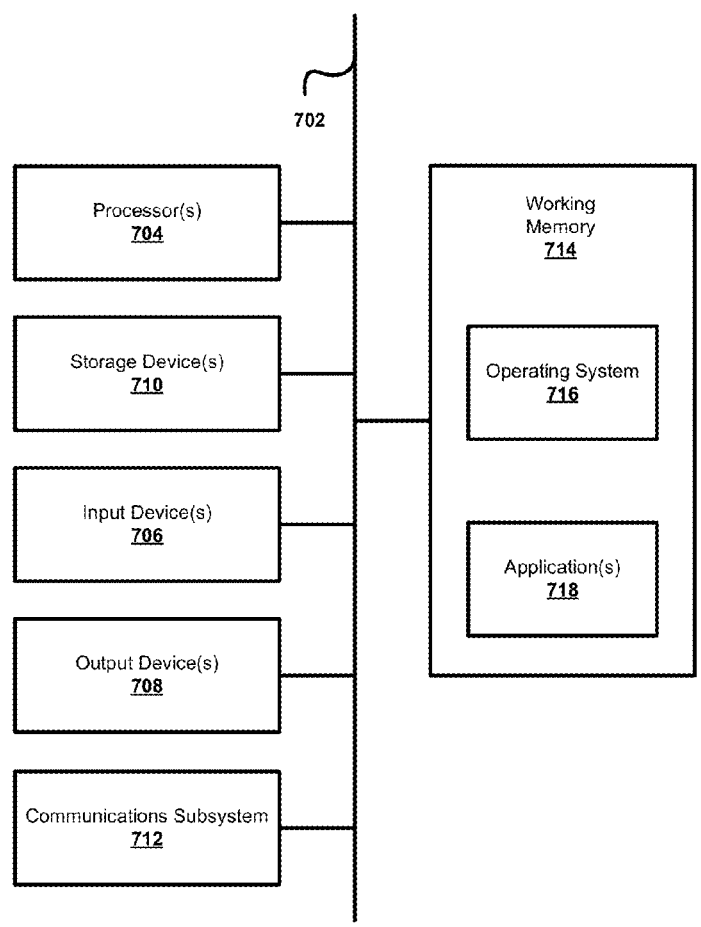
FIG. 7 shows an example computing system or device.

FIG. 7 shows an example computer system or device 700 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2. In this manner, any of one or more of the respective elements of at least FIG. 2 may be configured to perform and/or include instructions that, when executed, perform the method of FIG. 1 and/or the method of FIG. 5. Still further, any of one or more of the respective elements of at least FIG. 2 may be configured to perform and/or include instructions that, when executed, instantiate and implement functionality of the PTR 210, the STB 220, and/or the server 218.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/ or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    detecting, by a television receiver during a primary recording of particular programming, degradation of a received signal quality associated with the particular programming to at or below a predetermined threshold value;
    instantiating, by a television receiver in response to the detecting, a secondary recording of the particular programming during the primary recording when the particular programming is accessible over at least one terrestrial network;
    querying, by the television receiver over the at least one terrestrial network, a computing system to acquire content associated with at least one gap in content within the primary recording present due to received signal quality;
    outputting, by the television receiver for display by a presentation device during playback of the primary recording, a notification to enable access to the secondary recording instantiated by the television receiver when the at least one gap in content within the primary recording is unavailable over the at least one terrestrial network;
    acquiring content associated with the at least one gap in content within the primary recording;
    editing the primary recording to repair the at least one gap;
    and editing the primary recording to include a message that when displayed provides an indication as to successful repair of the primary recording.

2. The method of claim 1, further comprising receiving content associated with the secondary recording via an over-the-air network.

3. The method of claim 1, further comprising receiving content associated with the secondary recording via a packet-based network.

4. The method of claim 1, further comprising receiving content associated with the secondary recording from a system other than the computing system over the at least one terrestrial network.

5. The method of claim 1, further comprising receiving content associated with the secondary recording from the computing system over the at least one terrestrial network.

6. The method of claim 1, further comprising outputting for display by the presentation device the secondary recording in response to selection of the notification.

7. The method of claim 1, further comprising editing the primary recording to include at least one advertisement selected based upon one or more characteristics of the particular programming.

8. The method of claim 1, further comprising editing the primary recording to include at least one advertisement that when displayed provides an announcement of a product related to the particular programming and offered by an entity other than a satellite content provider associated with broadcast of the particular programming during the primary recording.

9. The method of claim 1, further comprising editing the primary recording to include at least one advertisement that when displayed provides an announcement of a product related to the particular programming and offered by a satellite content provider associated with broadcast of the particular programming during the primary recording.

10. A television receiver, comprising: one or more processors; and
   a memory communicatively coupled with and readable by the one or more processors and having stored therein processor-readable instructions that, when executed by the one or more processors, cause the one or more processors to perform operations including:
   instantiating a secondary recording of particular programming during a primary recording of the particular programming when the particular programming is accessible over at least one terrestrial network during the primary recording and a received signal quality associated with the primary recording is at or below a predetermined threshold value;
   querying, over the at least one terrestrial networks a computing system to acquire content associated with at least one gap in content within the primary recording present due to received signal quality; outputting, for display by a presentation device during playback of the primary recordings a notification to enable access to the secondary recording instantiated by the television receiver when the at least one gap in content within the primary recording is unavailable over the at least one terrestrial networks;
   acquiring content associated with the at least one gap in content within the primary recording;
   editing the primary recording to repair the at least one gap; and editing the primary recording to include a message that when displayed provides an indication as to successful repair of the primary recording.

11. The television receiver of claim 10, wherein the operation further include:
   detecting, during the primary recording, degradation of the received signal to at or below the predetermined threshold value.

12. The television receiver of claim 10, wherein the operations further include:
   detecting receipt of content associated with the secondary recording via one of an over-the-air network and a packet-based network.

13. The television receiver of claim 10, wherein the operations further include:
   detecting receipt of content associated with the secondary recording from one of the computing system and a system other than the computing system over the at least one terrestrial network.

14. The television receiver of claim 10, wherein the operations further include:
   editing the primary recording to include at least one advertisement that when displayed provides an announcement of a product related to the particular programming and offered by an entity other than a satellite content provider associated with broadcast of the particular programming during the primary recording.

15. The television receiver of claim 10, wherein the operations further include:
   editing the primary recording to include at least one advertisement that when displayed provides an announcement of a product related to the particular programming and offered by a satellite content provider associated with broadcast of the particular programming during the primary recording.

16. A method, comprising:
   detecting, by a television receiver during a primary recording of particular programming, degradation of a received signal quality associated with the particular programming to at or below a predetermined threshold value;
   instantiating, by a television receiver in response to the detecting, a secondary recording of the particular programming during the primary recording when the particular programming is accessible over a terrestria l network selected from an over-the-air network and a packet-based network;
   querying, by the television receiver over the at least one terrestrial network, a computing system to acquire content associated with at least one gap in content within the primary recording present due to received signal quality;
   receiving content associated with the secondary recording from one of the computing system and a system other than the computing system over the at least one terrestrial network;
   outputting, by the television receiver for display by a presentation device during playback of the primary recording, a notification to enable access to the secondary recording instantiated by the television receiver during playback of the primary recording;
   outputting for display by the presentation device the secondary recording in response to selection of the notification;
   acquiring content associated with the at least one gap in content within the primary recording;
   editing the primary recording to repair the at least one gap; and editing the primary recording to include a message that when displayed provides an indication as to successful repair of the primary recording.

17. The method of claim 16, further comprising:
   receiving content associated with the secondary recording from a system other than the computing system over the at least one terrestrial network.

18. The method of claim 16, further comprising:
   editing the primary recording to include at least one advertisement selected based upon one or more characteristics of the particular programming.

19. The method of claim 16, further comprising:
   editing the primary recording to include at least one advertisement that when displayed provides an announcement of a product related to the particular programming and offered by an entity other than a satellite content provider associated with broadcast of the particular programming during the primary recording.

20. The method of claim 16, further comprising:
   editing the primary recording to include at least one advertisement that when displayed provides an announcement of a product related to the particular programming and offered by a satellite content provider associated with broadcast of the particular programming during the primary recording.

\* \* \* \* \*